United States Patent [19]

Todo et al.

[11] Patent Number: 5,577,902
[45] Date of Patent: Nov. 26, 1996

[54] ROBOT HAND FOR FORGING WORKING

[75] Inventors: Yoshinori Todo; Masami Sakamoto; Noriaki Ushijima; Akira Sonoda; Yukio Miura; Kyousuke Araki; Kenichi Yoshida, all of Nagasaki, Japan

[73] Assignee: Director-General of Agency of Industrial Science and Technology, Tokyo, Japan

[21] Appl. No.: 243,324

[22] Filed: May 16, 1994

[51] Int. Cl.$^6$ .................................................. G25J 17/02
[52] U.S. Cl. ........................... 414/735; 294/86.4; 901/29; 901/45
[58] Field of Search .................................. 414/729, 735; 294/86.4; 901/27, 28, 29, 45

[56] References Cited

U.S. PATENT DOCUMENTS

| | | |
|---|---|---|
| 3,893,217 | 7/1975 | Edmond . |
| 4,445,273 | 5/1984 | Van Brussel et al. ............... 901/45 X |
| 4,629,385 | 12/1986 | Irie ............................... 294/86.4 X |

FOREIGN PATENT DOCUMENTS

| | | |
|---|---|---|
| 2379848 | 9/1978 | France . |
| 2619043 | 2/1989 | France . |
| 1527363 | 8/1969 | Germany . |
| 60-103690 | 7/1985 | Japan . |
| 4228236 | 8/1992 | Japan . |

*Primary Examiner*—Donald W. Underwood
*Attorney, Agent, or Firm*—Antonelli, Terry, Stout & Kraus

[57] ABSTRACT

A robot hand for gripping workpieces to be forged which are subjected to impact loads is provided. The robot hand 2 includes a grip 3 for gripping a workpiece to be forged and a grip support 2a for supporting the grip 3. A grip guide 12 for supporting the grip 3 so that it is movable in a plane perpendicular to the longitudinal axis of the grip support and slidable in forward and rearward directions and a spherical seat 5 for bearing the grip guide 12 so that it can be inclined are provided within a casing 4 of the grip support 2a. The casing 3 of the grip support 2a is provided with various actuators 9, 10, 11, 7 for changing the supporting state between a state in which the grip 3 can be moved and inclined and a state in which the grip 3 can not be moved and inclined. The grip 3 is brought into the movable and inclinable state for absorbing an impact when the impact load is applied to the gripped workpiece to be forged.

16 Claims, 6 Drawing Sheets

FIG. I

ROBOT HAND FOR FORGING WORKING

BACKGROUND OF THE INVENTION

1. Technical Field

The present invention relates to a robot hand for a forging apparatus which is capable of carrying out forging using a robot, in particular die forging performed on a die having a plurality of stamping impressions thereon as well as hammer forging and press forging, and in particular to a robot which can protect a robot hand per se and the robot main body by reducing the impact occurring on hammering, and which is capable of accurately positioning a workpiece to be forged on each of plural stamping impressions.

2. Related Art

There is not known a robot hand which is capable of suitably coping with deformation of material due to impacts, vibrations and hammering occurring in association with die forging especially performed on a die having a plurality of stamping impressions using a hammer.

Die forging using a hammer generates impacts and vibrations since it involves deforming material to be forged with impact energy. It is difficult to stably hold the material to be forged with a conventional robot or manipulator.

Deformation of blank material and the shape of resulting burrs is irregular, and in particular, a gripped portion of the material to be forged is irregularly deformed. In die forging in which forging is carried out for each of the stamping impressions after the material is successively moved relative to each of a plurality of stamping impressions on a die, a robot is unable to accurately load the material to be forged on next stamping impression of the die due to changes in relative position between the robot hand and the material which is subject to plastic deformation. Such forging has heretofore been conducted by manually holding workpieces to be forged.

SUMMARY OF THE INVENTION

The present invention was made to overcome the above mentioned problems.

It is an object of the present invention to provide a robot hand for forging which relaxes or mitigates the impacts on hammering or pressing so as to protect the robot hand per se and the main body of the robot, and which is capable of freely following the displacement of a gripped portion of a workpiece and is capable of accurately moving the workpiece on stamping impressions.

In order to accomplish the above mentioned object of the present invention, there is provided a robot hand for gripping a workpiece to be forged comprising a grip hand for gripping said workpiece to be forged; and a grip hand support for supporting the grip hand so that the grip hand is movable in a desired direction in an imaginary plane perpendicular to the longitudinal axis of the grip hand support, inclinable in a desired direction in a three-dimensional space around a point on the imaginary plane as a center, slidable in an axial direction of the grip hand, and rotatable around an axis; the grip hand including a plurality of fingers for gripping the workpiece to be forged; and a grip body having one end thereof on which the fingers are movably mounted; the grip hand support including a casing into which the other end portion of the grip body is inserted; support means disposed in the casing for supporting the other end portion of the grip body so that the grip hand is movable, inclinable rotatable and slidable relative to the casing; and supporting state changing means for changing the supporting states among a displacement changing state, in which the grip hand is movable, inclinable, rotatable and slidable relative to the casing when an external force is applied to the grip hand gripping the workpiece to be forged; a constraining state in which the grip hand, which is displacable relative to the casing, is constrained so as to make its movement, inclination, rotation and sliding impossible unless an external force which is not less than a predetermined force is applied to the grip hand; and an initial neutral position constraining state in which the grip hand which has been displaced relative to the casing is returned to a predetermined initial neutral position and the movement, inclination, rotation and sliding of the grip hand is constrained so as to make its movement, inclination, rotation and sliding impossible in the initial neutral position.

The term "imaginary plane" means a plane which is perpendicular to the axis of the grip guide and corresponds to a plane which is taken along a line A—A in FIG. 1. The spherical surface and the spherical bearing seat formed in a grip guide, which will be described hereafter, are moved in a radial direction (in a desired direction of said imaginary plane).

It is to be understood that a term "hydraulic actuator(s)" used herein also includes "pneumatic actuator(s)".

The support means of the robot hand may preferably comprise a grip guide to which the other end portion of the grip body is inserted and a part of the outer periphery of which is formed with a spherical surface, for supporting the grip body so that it is movable in an axial direction thereof; and a spherical seat which is in contact with the spherical surface of the grip guide for bearing the grip guide so that the grip guide is inclinable in a desired direction within a three dimensional space around a point on the imaginary plane which is perpendicular to the axis of the casing, the point being midway through the casing, the grip guide into which the grip body is inserted and the spherical seat for supporting the grip guide being movable in the imaginary plane.

In this case, the supporting state changing means may preferably include a hydraulic actuator having a piston which is displaceable in an axial direction of the grip body between the movement constraining position, in which the front end portion of the piston is in contact with the grip body (end face opposite to the fingers) and a movement enabling position, in which the front end portion of the piston is not in contact with the grip body.

The supporting state changing means preferably further includes a hydraulic actuator having a piston which is capable of biasing at the front end thereof toward the outer periphery of the grip body via a brake liner for constraining the axial movement between the grip guide and the grip body.

The supporting state changing means preferably includes three or more hydraulic actuators, each having a piston which is movable in said imaginary plane between a movement constraining position and in which the front end portion of the piston is in contact with said spherical seat and a movement enabling position in which the front end portion thereof is not in contact with said spherical seat.

The supporting state changing means preferably includes three or more hydraulic actuators, in positions remote from the spherical surface on the grip guide, each having a piston which is movable between an inclination constraining position, in which the front end portion of the piston is in contact with said grip guide and an inclinable position in which the front end portion of the piston is not in contact with said grip guide to return the inclination of the grip guide to the initial neutral (horizontal) position.

The spherical bearing seat is divided into two parts disposed to the front and to the rear of the imaginary plane assumed in the casing. A small space is formed between the divided spherical bearing seat halves. A ring-piston type hydraulic actuator is preferably provided adjacent to the spherical bearing seat. A hydraulic actuator having a piston for biasing the spherical bearing seat halves toward the imaginary plane (in an axial direction) is provided. The hydraulic actuators sandwich therebetween a spherical surface with two divided spherical bearing seat halves to hold the grip guide while it is moved in a desired direction in the imaginary plane and simultaneously to hold the grip guide while it is inclined in a desired position.

A space is formed between the inner edges of the spherical bearing seat halves. It is preferable to fill the space with elastomer such as rubber to keep constant a position of the grip hand, with a frictional force between the elastomer and the halves even if hydraulic pressure is not applied upon said ring piston. Maintaining of the grip hand in a constant position can be achieved even if the biasing force of the spherical bearing seat halves is reduced by controlling the hydraulic pressure of the ring piston in lieu of filling the space with elastomer.

A robot having the above mentioned robot hand may preferably include a robot hand support for rotating the robot hand around an axis of the grip support of the robot hand.

Further, there is provided a robot hand for gripping a workpiece to be forged comprising a grip for gripping the workpiece to be forged; and a grip support for supporting the grip so that the grip is movable in directions parallel with and rotatable around three independent axes which are perpendicular to each other in a three-dimensional space and is movable in a resultant direction of two or three axes; the grip including a plurality of fingers for gripping the workpiece to be forged; and a grip body having one end thereof on which the fingers are movably mounted; the grip support including a casing into which the other end portion of the grip body is inserted; support means disposed in the casing for supporting the other end portion of the grip body so that the grip is movable and rotatable relative to the casing; and supporting state changing means for changing the state among a displacement enabling state in which the grip is movable and/or rotatable relative to the casing when an external force is applied to the grip which grips the workpiece to be forged; a constraining state, in which the grip is constrained to make movement and rotation impossible unless an external force which is not less than predetermined force is applied to the grip after the grip is moved and/or rotated relative to the casing; an initial position constraining state in which the grip is returned to a predetermined initial position relative to the casing and is constrained in the initial position to prevent its movement and rotation even if the grip is moved and/or rotated relative to the casing.

The support means of the robot hand may comprise a grip guide to which the other end portion of the grip body is inserted and a part of the outer periphery of which is formed with a spherical surface, for supporting the grip body so that it is movable in a direction of any of the three axes; and a spherical seat which is in contact with the spherical surface of the grip guide for bearing the same so that the grip guide is rotatable around the three axes; wherein, said casing is formed in such a manner that said grip guide to which the grip body is inserted and the spherical seat for bearing the grip guide are movable within the casing.

Operation of the present invention is as follows:

The robot hand of the present invention grips one end (gripped portion) of the blank workpiece to load the workpiece between upper and lower dies of a forging machine. Even if the gripped portion of the workpiece is displaced due to plastic deformation of the workpiece, the impact deformation is absorbed by movement of the hand in a desired direction, its inclination and/or rotation in a three-dimensional space for protecting the robot hand per se and main body of the robot. Accurate movement of the blank workpiece on a stamping impression is enabled by holding the workpiece in the displaced position with hydraulic pressure.

BRIEF DESCRIPTION OF THE INVENTION

BEST MODE FOR EMBODYING THE INVENTION

The present invention will now be described in detail by way of an embodiment.

Figure 1:
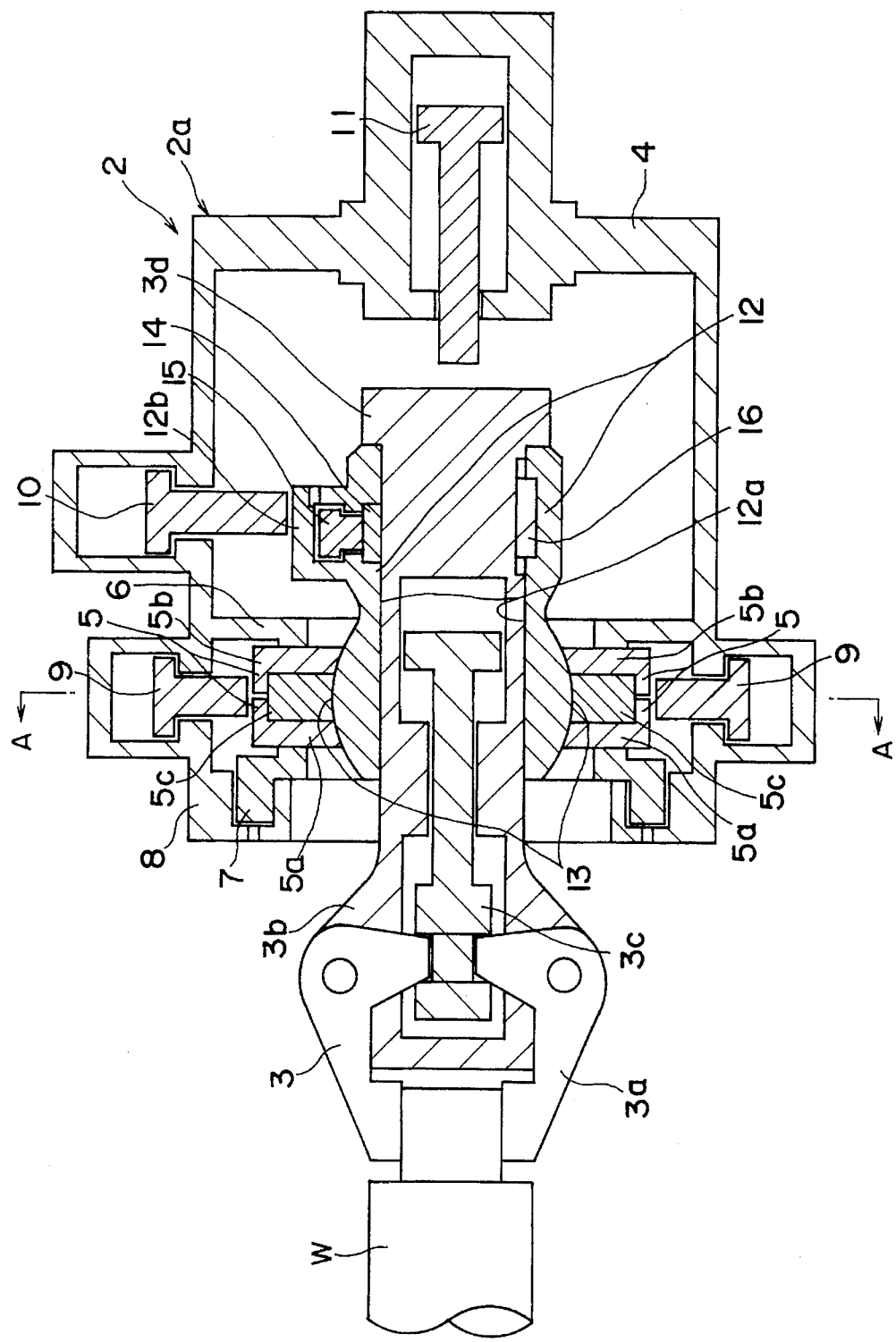
FIG. 1 is a sectional view showing an embodiment of a robot hand according to the present invention.
Figure 2:
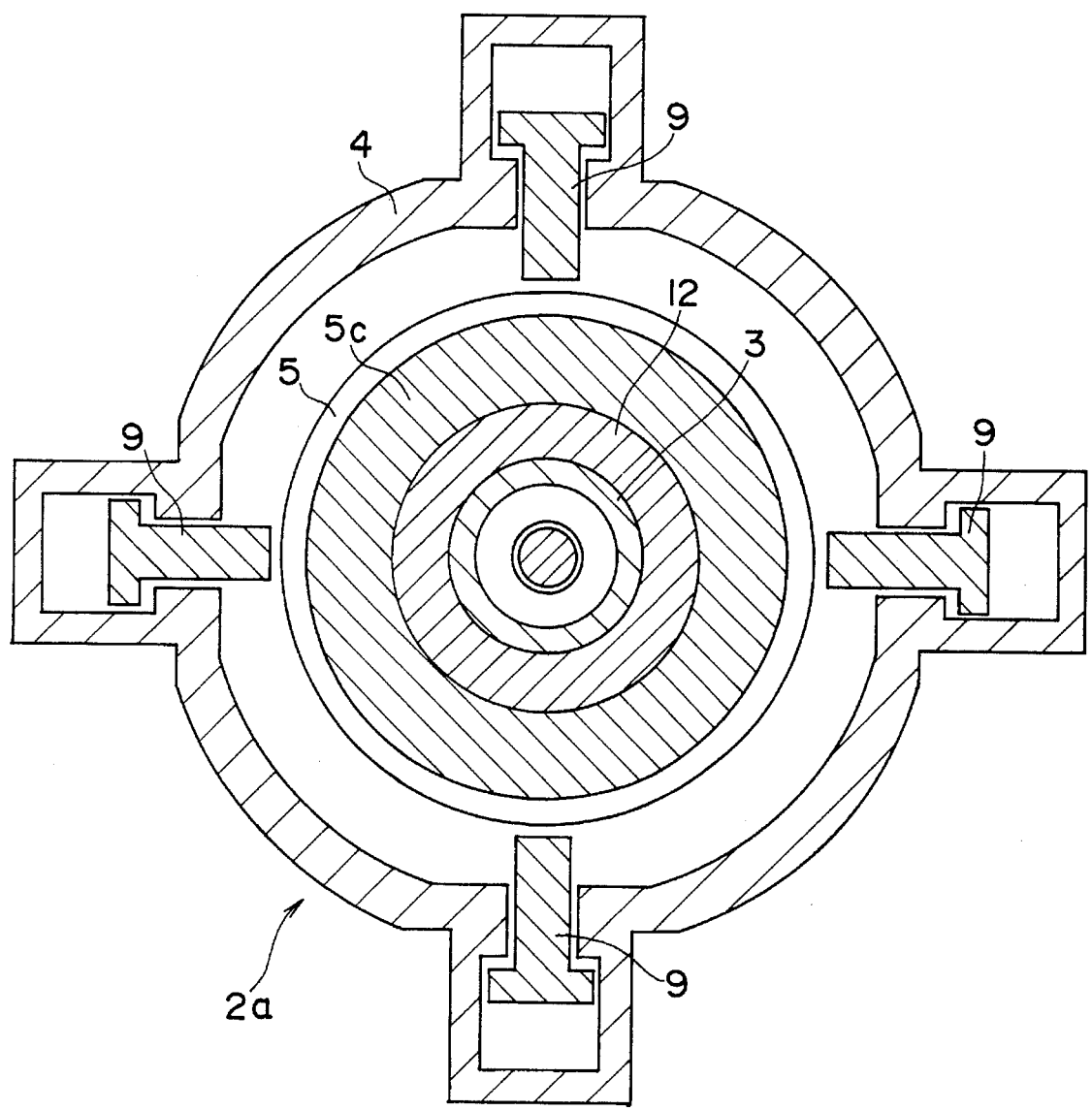
FIG. 2 is a sectional view taken along the line A—A in FIG. 1.

A robot of the present embodiment is adapted to grip a blank workpiece W to be forged at one end thereof along the length thereof for facilitating the forging as shown in FIG. 1. A robot arm 1 (FIG. 3) is movably mounted on the main body (not shown) of the robot. The robot arm 1 is provided with a robot hand 2 at the front end thereof. The robot hand 2 comprises a grip hand 3 for directly gripping the blank workpiece W at one end of the workpiece along the length thereof and a grip support 2a into which the rear portion of the grip hand 3 is inserted for supporting the grip hand 3. Robot arm 1 is capable of supporting robot hand 2 while permitting rotation of the robot hand around the longitudinal axis of grip support 2a.

The grip support 2a is opened at the front end thereof and is hollow in shape. The grip support 2a is provided therein with a mechanism for holding the rear side portion of the grip hand 3 so that the grip hand 3 is vertically and laterally movable line A—A in FIG. 1 and can be inclined. The rear side portion of the grip hand 3 is formed in such a manner that it is held so as to be forwardly or backwardly slidable.

An inner chamber of the grip support 2a and the rear portion of the grip hand 3 constitute a buffer portion for buffering the impact vibrations of the grip hand 3 which occur due to hammering during forging. The buffering portion reduces or mitigates the impact on hammering to protect the robot hand 2 per se and the robot main body of the robot and enables accurate movement of the workpiece to the stamping impressions by following the displacement of the grip hand 3 which grips the workpiece W.

As mentioned above, the grip support 2a includes an outer cylinder 4 which is hollow therein and is opened at the front end thereof. A spherical bearing seat 5 is held on the inner periphery of the open end portion of the outer cylinder 4 so that the spherical bearing seat 5 is movable in vertical and lateral directions. The spherical bearing seat 5 is adapted to support or bear the spherical surface 13 which is formed on the front portion of the grip guide 12 which will be described hereafter. The spherical bearing seat 5 is annular in shape and the inner annular peripheral surface thereof functions as a spherical bearing seat.

The annular spherical bearing seat 5 includes spherical bearing seat halves 5a and 5b which are in front and rear positions in an axial direction. A slight gap is formed between the facing surfaces of the spherical bearing seat halves 5a and 5b along the outer edges thereof. A space is formed between the spherical bearing seat halves 5a and 5b in a radial direction from the insides thereof to the inner edges thereof and is filled with an annular elastomer 5c.

The elastomer 5c functions to bias the front and rear spherical bearing seat halves 5a, 5b upon a ring piston 7 and a guide 6 by its spring force so as to prevent the spherical bearing seat halves from moving in vertical and lateral directions with its frictional force. The elastomer 5c may be, for example, urethane rubber.

The elastomer 5c is in contact with the spherical surface 13 of the grip guide 12 at the inner peripheral surface thereof to prevent the grip guide 12 from inclining by its frictional resistance. Even if no hydraulic pressure is applied to the ring piston 7, which will be described hereafter, the elastomer 5c serves to maintain the grip hand 3 at a constant position. Since the above mentioned constraint is due to the frictional force of the elastomer 5c, the spherical bearing seat halves 5a, 5b and the grip guide 12 would be displaced or inclined if an impact force which is larger than this frictional force is applied to the grip hand 3.

A guide 6 which is in contact with the rear side of the annular spherical bearing seat 5 to constrain it, is provided on the inner peripheral surface of the inner wall of the outer cylinder 4 on the opening side thereof. The guide 6 is formed along the inner periphery of the outer cylinder 4 and projects therefrom in an inner radial direction thereof. The ring piston 7 is mounted on the peripheral edge portion 8 of the opening of the outer cylinder 4, which is located in front of the guide 6 and biases the front side of the annular spherical bearing seat 5 to the guide 6.

The annular spherical bearing seat 5 is sandwiched on the front and rear sides thereof between the ring piston 7 and the guide 6 so that it is held in position. The ring piston 7 is arranged so that its biasing force upon the spherical bearing seat 5 is controlled with fluid pressure. The elastomer 5c may be omitted, for example, by making the hydraulic pressure applied upon the ring piston 7 changeable between high and low levels and by lowering the biasing force of the ring piston 7 to a force corresponding to the above mentioned elastic force of the elastomer 5c.

Center returning actuators 9, each including a hydraulic or pneumatic actuator or the like, are adapted to return the vertically and/or laterally displaced spherical bearing seat 5 to a neutral position in the vertical and lateral directions. A total of at least three center returning actuators 9 (four actuators at angles of 90° in this embodiment) are provided in the outer cylinder 4 between the ring piston 7 and the guide 6. Each of the center returning actuators 9 includes a piston which is movable in a plane perpendicular to the forward or rearward direction. Each center returning actuator 9 is mounted in such a manner that the front end of the piston of each center returning actuator 9 biases the outer peripheral surface of the spherical bearing seat 5 in an inner radial direction within the outer cylinder 4. Each center returning actuator 9 is controlled with hydraulic pressure. When supply of the hydraulic fluid to the center returning actuator 9 ceases, the piston is retracted.

Inclination returning actuators 10 each including a hydraulic or pneumatic actuator or the like are adapted to return the inclined grip hand 3 to an original horizontal position. A total of at least three (4 at angles of 90° in this embodiment) inclination returning actuators 10 are provided in the outer cylinder 4 to the rear of the guide 6. Each of the inclination returning actuators 10 includes a piston which is movable in a plane perpendicular to the forward or rearward direction. Each inclination returning actuator 10 is mounted in such a manner that the front end of the piston of the inclination returning actuator 10 biases a grip guide 12 which is fitted on the rear portion of the grip hand 3 in an inner radial direction within the outer cylinder 4. Each inclination returning actuator 10 is controlled with hydraulic pressure. When supply of the hydraulic fluid to the center returning actuator 10 ceases, the piston is retracted.

A forward returning actuator 11 including a hydraulic or pneumatic actuator or the like is adapted to return the axially displaced grip hand 3 to an original forward position and is provided within the outer cylinder 4 at the rear end thereof. The forward returning actuator 11 includes a piston which is axially movable. The forward returning actuator 11 is mounted in such a manner that the front end of the forward returning actuator 11 biases the rear end of the grip hand 3 in a forward direction. The forward returning actuator 11 is controlled with hydraulic pressure. When supply of the hydraulic fluid to the forward returning actuator 11 ceases, the piston is retracted.

The grip hand 3 includes a plurality of fingers 3a for gripping a workpiece, a grip body 3b for supporting the plurality of fingers 3a so that they are movable, and a piston 3c which moves forwards and backwards within the grip body 3b to operate the plurality fingers 3a for gripping the blank workpiece. The grip guide 12 is fitted to the rear portion of the grip hand 3. Specifically, the grip guide 12 is formed with a hole 12a therein into which the rear portion of the grip hand 3 is fitted so that the grip hand 3 is axially slidable. The grip hand 3 is provided on the outer periphery thereof at the rear end thereof with a stopper 3d which projects in an outer radial direction. This stopper 3d serves to prevent the grip guide 12 from being removed from the rear end of the grip hand 3.

The grip guide 12 is formed on the outer surface thereof on the front side thereof with the spherical surface 13 which is seated on the above mentioned spherical bearing seat 5 so that the grip guide 12 can be inclined. The outer peripheral surface of the grip guide 12 on the rear side which is in contact with the front ends of the pistons of the inclination returning actuators 10 is formed into flat surfaces 12b. The number of flat surfaces 12b is equal to the number of inclination returning actuators 10.

A brake liner 14 is provided on the inner periphery of the hole 12a which is on the rear side of the grip guide 12. A piston 15 for biasing the brake liner 14 is disposed on the outer side of the brake liner 14 at the rear end of the grip guide 12. The piston 15 can exert bias upon the outer periphery of the grip body 3b via the liner 14 so as to prevent the grip body 3b from moving in an axial direction thereof. A cotter 16 is provided between the hole 12a and the grip hand 3 to prevent relative rotation therebetween and to allow forward and rearward movement thereof.

Now, operation of the above mentioned embodiment will be described.

The spherical surface 13 of the grip guide 12 is seated on the spherical bearing seat 5. Accordingly, the grip guide 12 and the grip hand 3 which is fitted on the guide 12 are afforded universal inclination and rotation. The spherical bearing seat 5 which bears the spherical surface 13 of the grip guide 12 is divided into axially front and rear halves which are separated from each other on the facing sides thereof to form a slight gap.

The front spherical bearing seat half 5a is biased backwardly by the ring piston 7 incorporated in the outer cylinder 4 to bias via, the elastomer 5c and the spherical surface 13 of the grip guide 12, the rear spherical bearing seat half 5b upon the guide 6 which is the front portion of the outer cylinder 4 and in a plane which is perpendicular to the axis of the cylinder 4. The elastomer 5c may be omitted by making the fluid pressure on the ring piston 7 adjustable. In lieu of one annular ring piston 7, several pistons may be disposed at equal angular spaces.

Two front and rear spherical bearing seat halves 5a and 5b sandwich therebetween the spherical surface 13 of the grip guide 12 to suppress the free movement of the grip guide 12 with frictional force to hold rotation or inclination of the grip guide 12 in a desired position. The spherical bearing seat 5, the grip guide 12 and the grip hand 3 can be held in a desired position with the frictional force caused due to the biasing force of the ring piston 7 without being slid downward.

If an external force which is larger than the above mentioned frictional force is applied to the grip hand 3 in a vertical or lateral direction, the spherical bearing seat 5, and thus the grip hand 3, would be moved in a vertical or lateral direction in plane A—A of FIG. 1, respectively, or the spherical surface 13, and thus the grip hand 3, may be inclined around the spherical bearing seat 5 which functions as a fulcrum Three or more center returning actuators 9 are disposed at equal angular spaces in the outer cylinder 4 opposite the spherical bearing seat 5. The spherical bearing seat 5 is biased in an inner radial direction from the outer side thereof by the pistons of the center returning actuators 9. This arrangement enables the vertically or laterally displaced spherical bearing seat 5 to be returned to the initial neutral position. Accordingly, the vertically or laterally displaced grip hand 3 can be biased so that it is returned to the center axis of the outer cylinder 4. When all the pistons of the plurality of actuators 9 extend to the extended stroke end, the spherical bearing seat 5 and the grip hand 3 can be positioned in the center, or the neutral position of the outer cylinder 4.

The rear portion of the grip guide 12 can be biased to return to the center of the outer cylinder 4 by three or more inclination returning actuators 10 which are disposed at equal angular spaces in the outer cylinder 4 which is on the rear side and on the outer periphery of the grip guide 12. When all the pistons extend to the extended stroke end, the rear portion of the grip guide 12 is positioned centrally of the outer cylinder 4. Accordingly, the grip guide 12 and the grip hand 3 can be positioned in the initial horizontal position by the mutual reaction between the center returning actuators 9 and the inclination returning actuators 10.

The flat surfaces 12b, which are equal in number to the number of inclination returning actuators 10, are provided on the outer periphery of the grip guide 12. By biasing the front ends (flattened) of the pistons of the inclination returning actuators 10 on the flat surfaces 12b, the displaced grip hand 3 can be returned to the initial neutral or home position.

Now, forging of a blank workpiece W, which is practically done using a die, will be described.

Figure 5:
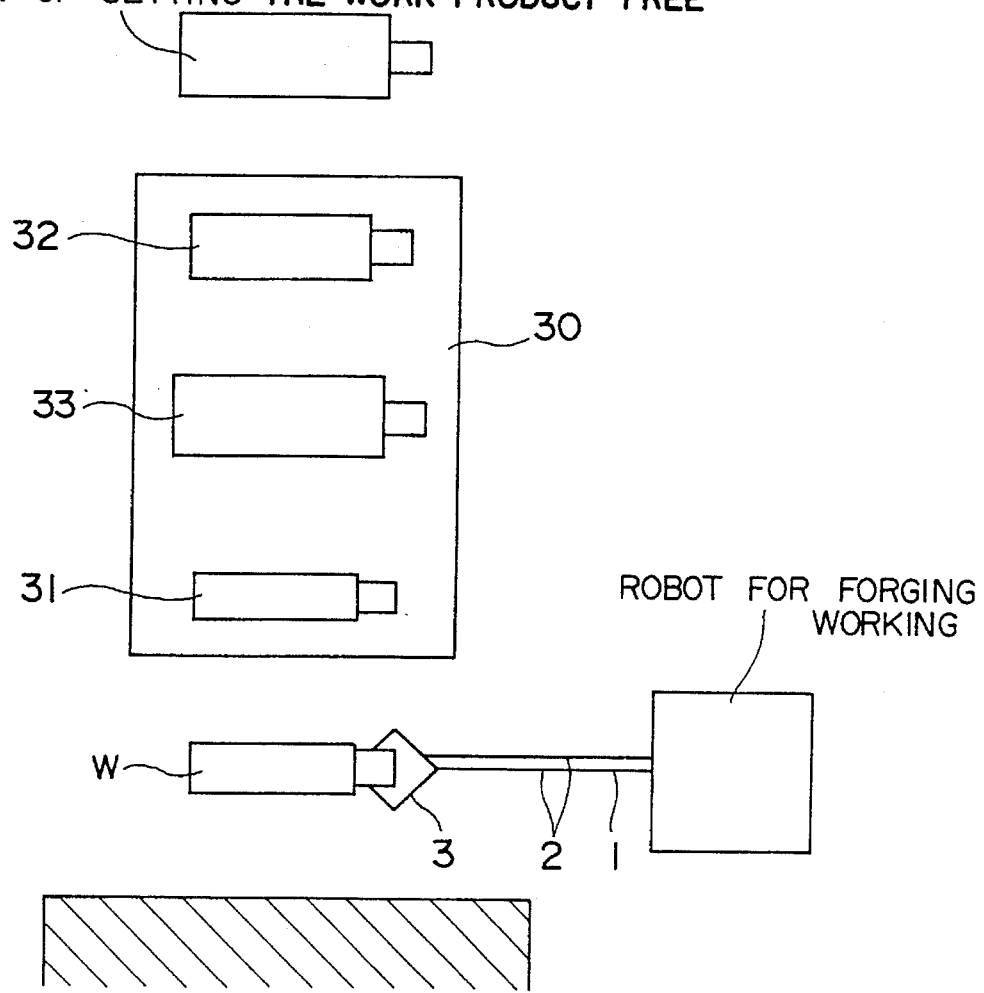
FIG. 5 is a plan view showing an example of the arrangement of the die and stamping impressions within a forging machine.
Figure 6:
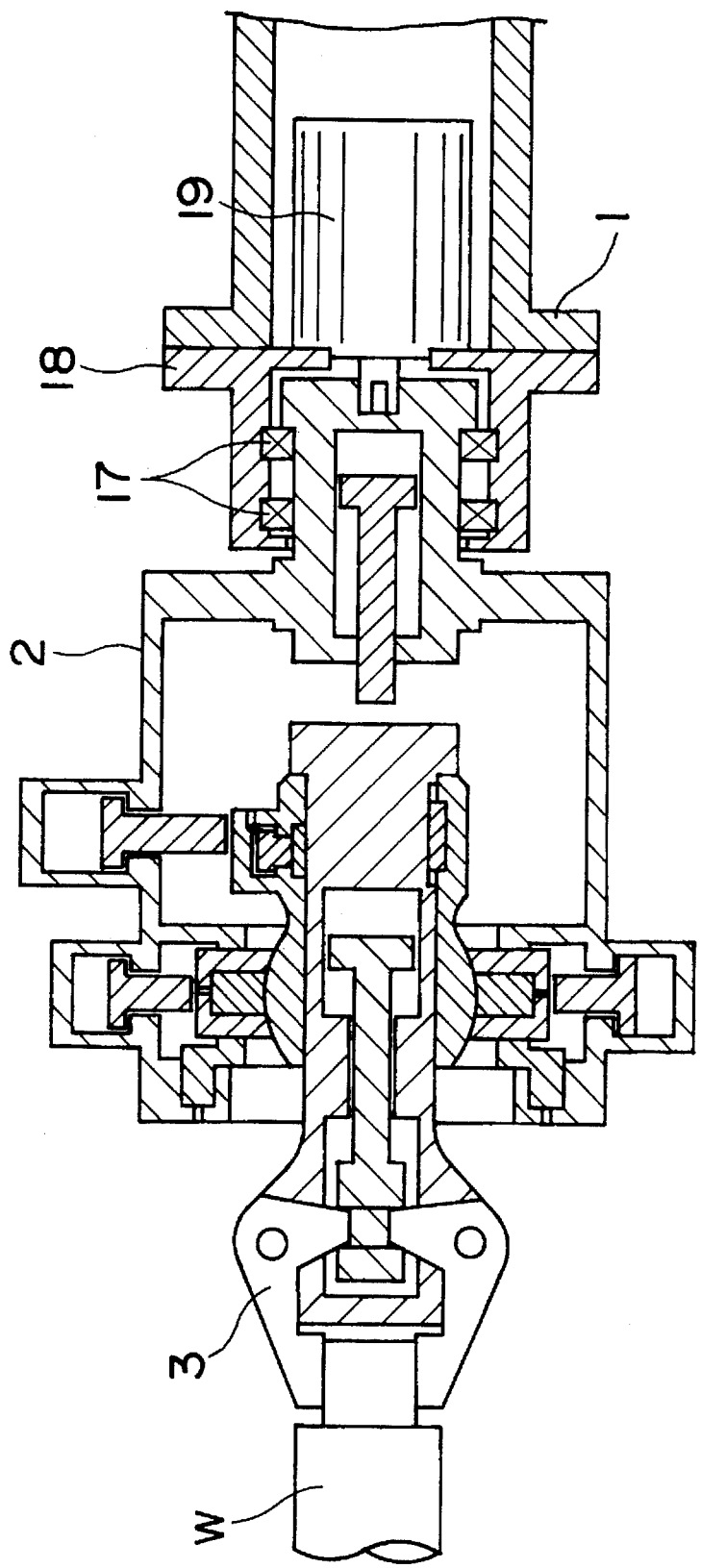
FIG. 6 is an elevational sectional view showing a case in which the robot hand is provided with a motor.

It is assumed that a die 30 is formed with a plurality of stamping impressions 31, 32, 33 for the workpiece W as shown in FIG. 5.

Firstly, hydraulic fluid is supplied to the actuators provided in the grip support 2a to position the grip hand 3 in the initial position for aligning the axis of the robot arm 1 with the axis of the grip hand 3.

Then hydraulic fluid is supplied into the grip body 3b to move the piston 3c in the grip body for gripping the blank workpiece W with the fingers 3a. The arm 1 is moved to align the central axis of the first stamping impression 31 with that of the robot arm 1 for loading the workpiece W slightly on the first stamping impression 31.

Figure 3:
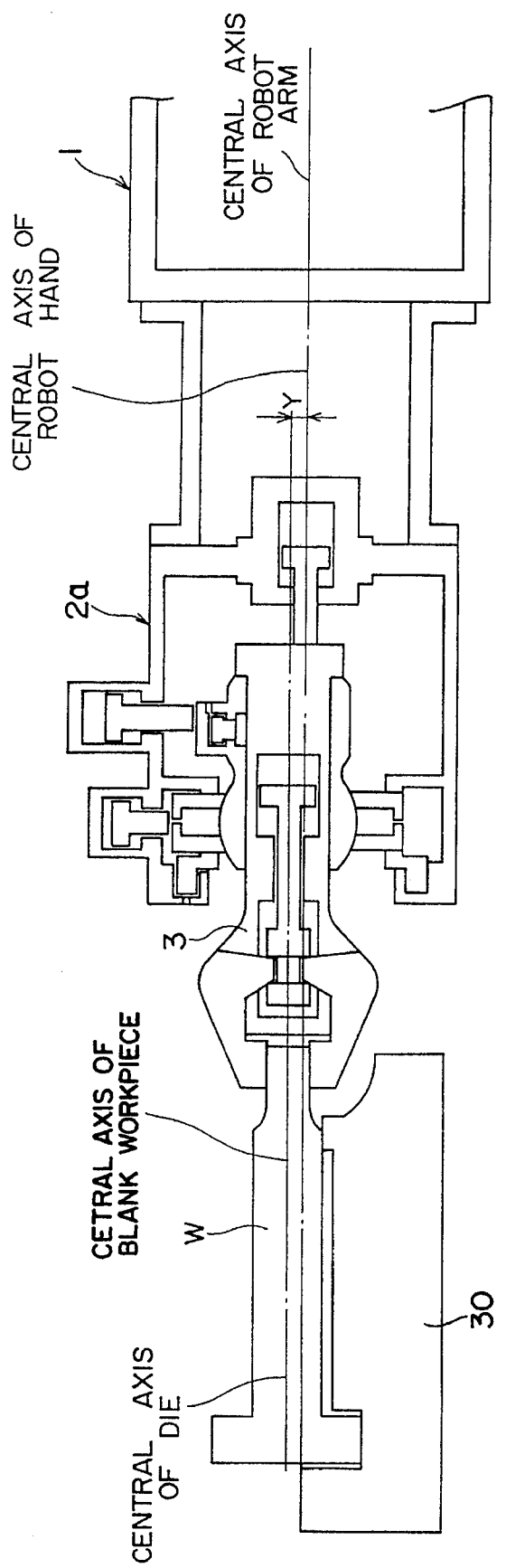
FIG. 3 is an explanatory view showing the positional relationship between die stamping impressions, a grip hand and a robot arm when a blank workpiece to be forged is loaded on a stamping impression of a die prior to forging.

While the workpiece W is loaded on the first stamping impression 31, introducing of hydraulic fluid into the center returning actuators 9, the inclination returning actuators 10, the forward returning actuator 11 and the ring piston 7 is stopped, or alternatively hydraulic or pneumatic pressure upon the ring piston 7 is lowered to decrease the constraining force upon the grip hand 3. Accordingly, the grip hand 3 is flexibly displaced relative to the outer cylinder 4 of the grip support 2a. When the workpiece is loaded on the stamping impression 31, the central axis of the grip hand 3, that is the center of the workpiece W, may be offset in a vertical direction from the center of the robot arm 1 (for example, offset by Y as shown in FIG. 3). If the workpiece W is deformed by hammering or application of a pressure under this condition, the position of the grip hand 3 is changed from that under predetermined conditions (for example, it changes to the condition of FIG. 4).

The position of the grip hand 3 is maintained by applying a pressure to the ring piston 7. In this case, maintaining of the position of the grip hand 3 is achieved by increasing the friction between the spherical bearing seat half 5b and the guide 6 and the friction between the spherical bearing seat halves 5a, 5b and the spherical surface 13 of the grip guide 12 by applying a pressure on the piston ring 7, or alternatively by increasing the friction between the grip hand 3d and the brake liner 14 by applying a pressure upon the piston 15. When the workpiece W is removed from the first stamping impression 31 and is then loaded on the second stamping impression 32, the workpiece W can be easily aligned with the second stamping impression by aligning the central axis of the first stamping impression with the central axis of the robot arm 1.

If the central axis of the robot arm 1 is always aligned with the central axis of the stamping impression of the die, accurate loading on next stamping impression can be made with reference to the central axis of the robot arm 1 whenever the grip hand 3 is deformed in any way due to deformation of the gripped portion of the workpiece W.

In the case of forging which requires movement of a workpiece to a plurality of stamping impressions, on starting of forging the grip hand 3 is in a given neutral position due to the four center returning actuators 9 disposed around the grip hand 3, the inclination returning actuators 10 and the forward returning actuator 11 which is provided in rear of the cylinder 4. The spherical bearing seat 5 and the brake liner 14 are biased upon the grip hand 3 by the ring piston 7 and the piston 15 which are actuated by the hydraulic pressure so that the position of the grip hand 3 is maintained.

Under this condition, the workpiece W is gripped and is loaded in position on the first stamping impression 31 between upper and lower dies.

When introducing of fluid into the center returning actuators 9, the inclination returning actuators 10, the forward returning actuator 11, the ring piston 7 and the piston 15 is stopped, the grip hand 3 is held with a small holding force caused by only the friction between the supporting spherical surface 13 of the grip guide 12 and the elastomer 5c. Although the grip hand 3 is held in a neutral position under this condition, it can be freely displaced in response to an external force which is generated by forging impact.

Figure 4:
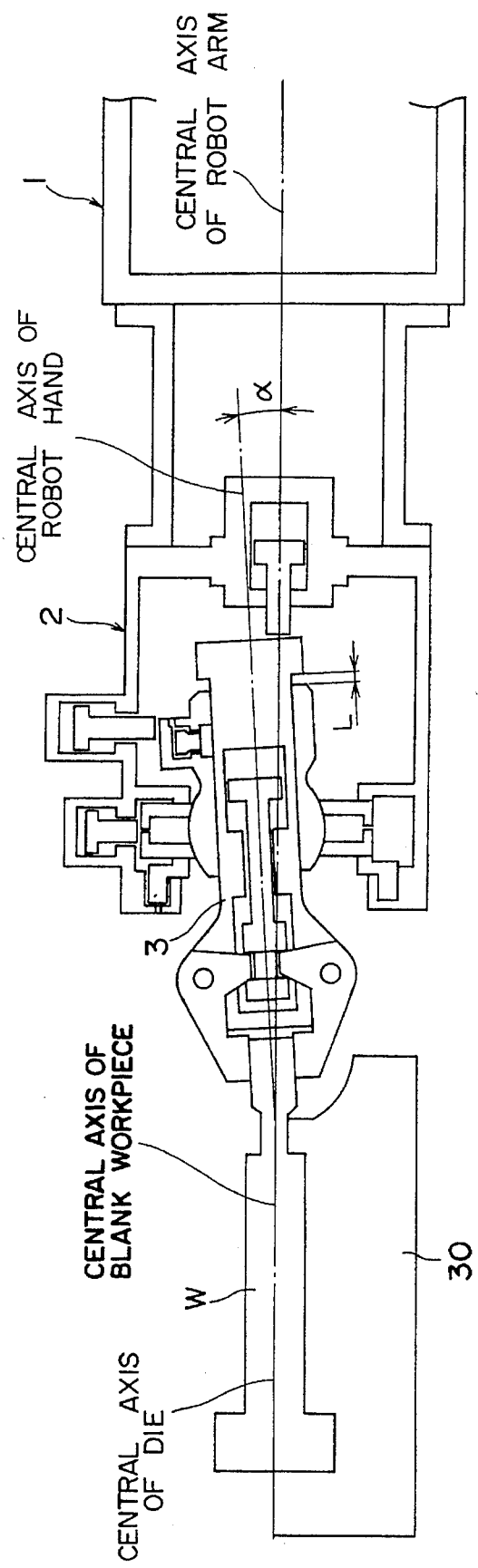
FIG. 4 is an explanatory view showing the positional relationship between the stamping impressions of a die, the grip hand and the robot arm after forging.

When forging is conducted under conditions shown in FIG. 3, for example, elongation (L) and/or bending (α) of the workpiece W occurs as shown in FIG. 4. The grip hand 3 is held in the displaced position as mentioned above, if hydraulic pressure is applied to the ring piston 7 and the piston 15 immediately after hammering.

The central axis of the robot arm 1 is aligned with the central axis of the die stamping impression. The robot arm 1 is moved to the stamping impression. If the central axis of next robot arm 1 is aligned with the central axis of the die stamping impression 32, the workpiece W can be accurately loaded on the next stamping impression 32 no matter how the position and orientation of the grip hand 3 is changed.

Supply of hydraulic pressure to the ring piston 7 and the piston 15 is removed immediately before the next hammering action as is done in the first hammering. While holding of the grip hand 3 is carried out with only the friction between the supporting spherical surface 13 of the grip guide 12 and the elastomer 5c, the next hammering action is conducted.

Thereafter, similar steps as mentioned above are repeated. After hammering on the last stamping impression 33 is completed, hydraulic pressure is applied to the ring piston 7 and the piston 15 for holding the grip hand 3, and the product workpiece is released in the next predetermined position.

Thereafter, the robot is returned to a position where it will grip the next workpiece W. At the returning step, supply of the hydraulic pressure to the ring piston 7 and the piston 15 is stopped and the grip hand 3 is returned to a given neutral position by operating four center returning actuators 9 provided around the grip hand 3, the inclination returning actuators 10 and the forward returning actuator 11 which is provided in the rear of the outer cylinder 4 in a proper timing relationship.

Then, hydraulic pressure is applied to the ring piston 7 and the piston 15 to hold the grip hand 3 for gripping the next workpiece for forging. Then the above mentioned steps may be repeated.

As mentioned above, a bearing 17 and a flange 18 are provided in the rear of the outer cylinder 4 of the robot hand 2, and a motor 19 may be mounted on the flange 18, which is then mounted on the robot arm 1.

In case of the thus formed alternative, the whole of the robot hand, that is, the workpiece W can be rotated by rotating the outer cylinder 4 of the robot hand 2 with an output shaft of the motor.

This enables the workpiece which has been bent in a vertical direction on the first stamping impression to be loaded on the second stamping impression after the workpiece is rotated by 90°.

Products which are bent in a horizontal direction can be forged.

It is to be understood that the present invention is not limited to only the above mentioned embodiments and that various modifications and alterations can be made within the spirit and scope of the invention.

In accordance with the robot hand for forging of the present embodiment, damages to the grip hand 3 and the main body of the robot can be prevented by the grip hand 3 which is universally displaced to absorb the impacts occurring on forging, even if forging is conducted while the robot hand grips the workpiece W, since the grip hand is provided with a spherical bearing seat and linear guide which enable the hand to be moved in any direction. Further, the forging period of time can be shortened since rehandling of the workpiece is not required whenever the workpiece is successively moved between stamping impressions in the case of forging using a die having a plurality of stamping impressions.

What is claimed is:

1. A robot hand for gripping a workpiece to be forged, comprising:

a grip hand for gripping the workpiece; and a grip hand support for supporting said grip hand;

said grip hand including a plurality of fingers for gripping the workpiece, and a grip body having two end portions, one end portion having said fingers movably mounted thereon; and said grip hand support having a longitudinal axis and including a casing into which the other end portion of said grip body is inserted; support means disposed in said casing for supporting said other end portion of said grip body so that said grip hand is movable relative to said casing in any desired direction in an imaginary plane passing through said casing and perpendicular to said longitudinal axis, inclinable relative to said casing in a desired direction in a three-dimensional space around a point on the imaginary plane and midway through said casing, and slidable relative to said casing in the direction of the longitudinal axis of said grip hand support; and supporting state changing means for changing the state of said grip hand support between a displacement changing state, in which said grip hand is movable, inclinable, and slidable relative to said casing when an external force is applied to said grip hand as said grip hand is gripping the workpiece, a constraining state in which said grip hand is constrained to inhibit the movement, inclination, and sliding thereof unless an external force greater than a predetermined force is applied to said grip hand, and an initial neutral position constraining state in which said grip hand is positioned at a predetermined initial neutral position and is constrained to inhibit the movement, inclination, and sliding thereof to make movement, inclination, and sliding, of said grip hand impossible.

2. A robot hand as defined in claim 1, in which said support means comprises a grip guide into which said other end portion of said grip body is inserted to support said grip body so that said grip body is slidable in an axial direction thereof, a part of the outer periphery of said grip guide being formed with a spherical surface; and a spherical seat in contact with said spherical surface of said grip guide for bearing said grip guide so that said grip guide is inclinable in a desired direction within the three dimensional space around the point on said imaginary plane; said support means permitting movement of said grip guide and said spherical seat in said imaginary plane.

3. A robot hand as defined in claim 1, in which said supporting state changing means includes a hydraulic actuator having a piston which is displaceable in an axial direction of said grip body between a movement constraining position, in which said grip hand support is in the constraining state with the front end portion of said piston in contact with said grip body, and a movement enabling position, in which said grip hand support is in the displacement changing state with the front end portion of said piston out of contact with said grip body.

4. A robot hand as defined in claim 1, in which said grip body has an outer peripheral surface positioned parallel with the grip body axis; and said supporting state changing means includes a brake liner in contact with said outer peripheral surface of said grip body and a hydraulic actuator for biasing said brake liner into contact with the outer peripheral surface.

5. A robot hand as defined in claim 2, in which said supporting state changing means includes at least three hydraulic actuators, each having a piston movable in said imaginary plane between a movement constraining position, in which said grip hand support is in the constraining state with the front end portion of the piston in contact with said spherical seat, and a movement enabling position, in which said grip hand support is in the displacement changing state with the front end portion thereof out of contact with said spherical seat.

6. A robot hand as defined in claim 2, in which said supporting state changing means includes at least three hydraulic actuators remote from said spherical surface on said grip guide, each hydraulic actuator having a piston movable between an inclination constraining position, in which said grip hand support is in the constraining state with the front end portion of the piston in contact with said grip guide, and an inclinable position, in which said grip hand support is in the displacement changing state with the front end portion of the piston out of contact with said grip guide.

7. A robot hand as defined in claim 5, in which said supporting state changing means includes at least three hydraulic actuators remote from said spherical surface on said grip guide, each hydraulic actuator having a piston movable between an inclination constraining position, in which said grip hand support is in the constraining state with the front end portion of the piston in contact with said grip guide, and an inclinable position, in which said grip hand support is in the displacement changing state with the front end portion of the piston out of contact with said grip guide.

8. A robot hand as defined in claim 2, in which said spherical seat includes a first part and a second part disposed, respectively, to the front and to the rear of said imaginary plane; and said supporting state changing means includes a hydraulic actuator having a piston for biasing said first and second seat parts toward said imaginary plane.

9. A robot hand as defined in claim 7, in which said spherical seat includes a first part and a second part disposed, respectively, to the front and to the rear of said imaginary plane; and said supporting state changing means includes a hydraulic actuator having a piston for biasing said first and second seat parts toward said imaginary plane.

10. A robot hand as defined in claim 8, in which said spherical seat further includes an elastomer between the first and second seat parts.

11. A robot hand as defined in claim 9, in which said spherical seat further includes an elastomer between the first and second seat parts.

12. A robot hand as defined in claim 2, in which said spherical seat includes a first part and a second part, disposed, respectively, to the front and to the rear of said imaginary plane, and an elastomer between the first and second seat parts.

13. A robot arm for gripping a workpiece, comprising:
(a) a robot hand including:
(i) a grip hand for gripping the workpiece; and
(ii) a grip hand support for supporting said grip hand;
said grip hand including a plurality of fingers for gripping the workpiece, and a grip body having two end portions, one end portion having said fingers movably mounted thereon;
said grip hand support having a longitudinal axis and including a casing into which the other end portion of said grip body is inserted; support means disposed in said casing for supporting said other end portion of said grip body so that said grip hand is movable relative to said casing in any desired direction in an imaginary plane passing through said casing and perpendicular to said longitudinal axis, inclinable relative to said casing in a desired direction in a three-dimensional space around a point on the imaginary plane and midway through said casing, and slidable relative to said casing in an axial direction of said grip hand; and supporting state changing means for changing the state of said grip hand support between a displacement changing state, in which said grip hand is movable, inclinable, and slidable relative to said casing when an external force is applied to said grip hand as said grip hand is gripping the workpiece, a constraining state in which said grip hand is constrained to inhibit the movement, inclination, and sliding thereof unless an external force greater than a predetermined force is applied to said grip hand, and an initial neutral position constraining state in which said grip hand is positioned at a predetermined initial neutral position and is constrained to inhibit the movement, inclination, and sliding thereof to make movement, inclination, and sliding of said grip hand impossible; and
(b) a robot hand support for rotating said robot hand around the longitudinal axis of said grip hand support to rotate said grip hand.

14. A robot arm as claimed in claim 13, in which said support means comprises a grip guide into which said other end portion of said grip body is inserted to support said grip body so that said grip body is slidable in an axial direction thereof, a part of the outer periphery of said grip guide being formed with a spherical surface; and a spherical seat in contact with said spherical surface of said grip guide for bearing said grip guide so that said grip guide is inclinable in a desired direction within the three dimensional space around the point on said imaginary plane; said support means permitting movement of said grip guide and said spherical seat in said imaginary plane.

15. A robot hand for gripping a workpiece to be forged, comprising:
a grip for gripping the workpiece; and
a grip support for supporting said grip so that said grip is movable in directions parallel with and rotatable around three independent axes which are perpendicular to each other in a three-dimensional space and so can be moved in a resultant direction;
said grip including a plurality of fingers for gripping the workpiece, and a grip body having two end portions, one end portion having said fingers movably mounted thereon;
said grip support including a casing into which the other end portion of said grip body is inserted; support means disposed in said casing for supporting said other end portion of said grip body so that said grip is movable and rotatable relative to said casing; and supporting state changing means for changing the supporting state of said grip support between a displacement enabling state, in which said grip is movable and/or rotatable relative to said casing when an external force is applied to said grip as said grip is gripping the workpiece, a constraining state, in which said grip is constrained to inhibit the movement and rotation thereof unless an external force greater than a predetermined force is applied to said grip, and an initial position constraining state in which said grip is positioned at a predetermined initial position relative to said casing and is constrained in said initial position to prevent movement and rotation thereof.

16. A robot hand as defined in claim 15, in which said support means comprises a grip guide into which said other end portion of said grip body is inserted to support said grip body so that said grip body is movable in a direction of any of said three axes, a part of the outer periphery of said grip guide being formed with a spherical surface; and a spherical seat in contact with said spherical surface of said grip guide for bearing said grip guide so that said grip guide is rotatable around said three axes;

wherein, said casing permits movement of said grip guide and said spherical seat within said casing.

* * * * *